(12) United States Patent
Royer et al.

(10) Patent No.: US 6,283,238 B1
(45) Date of Patent: *Sep. 4, 2001

(54) MOTORIZED GOLF BAG CART

(76) Inventors: Larry G. Royer, 4750 W. Cantrell, Decatur, IL (US) 62521; C. Calvin Hansen, 910 1/2 Garden Way, Suite A, Manhattan, KS (US) 66502; James Cotton, 1616 NE. 16$^{th}$ Way, Apt. 205, Gresham, OR (US) 97030; Clyde J. Fleener, 415 NW. Highway 50, Centerview, MO (US) 64019

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,818

(22) Filed: Jan. 27, 1999

(51) Int. Cl.$^7$ ............................ B62D 51/04; B62D 61/00
(52) U.S. Cl. .................. 180/19.1; 180/208; 180/906; 280/DIG. 6
(58) Field of Search .................. 180/19.1, 19.3, 180/208, 906; 280/DIG. 5, DIG. 6, 655, 47.29, 42, 654, 655.1, 47.41, 298

(56) References Cited

U.S. PATENT DOCUMENTS

| | | | |
|---|---|---|---|
| D. 270,772 | 9/1983 | Radencic | D34/15 |
| D. 300,577 | 4/1989 | Pope et al. | D34/15 |
| D. 347,505 | 5/1994 | Machen et al. | D34/15 |
| D. 347,719 | 6/1994 | Machen et al. | D34/15 |
| D. 353,698 | 12/1994 | Stevens | D34/15 |
| 3,247,923 | 4/1966 | Cornell . | |
| 3,463,504 | 8/1969 | Petry et al. | 280/655.1 |
| 3,941,198 | 3/1976 | Kappas | 280/DIG. 5 |
| 3,952,821 | 4/1976 | Craven | 180/19.1 |
| 4,019,597 | 4/1977 | Carmichael | 180/19.2 |
| 4,063,612 | 12/1977 | Weiss | 180/19.2 |
| 4,106,583 | 8/1978 | Nemeth | 280/DIG. 5 |
| 4,232,755 | 11/1980 | Dow | 280/298 |
| 4,356,875 | 11/1982 | Clune | 280/DIG. 5 |
| 4,418,776 | 12/1983 | Weirick | 280/DIG. 5 |
| 4,506,897 | 3/1985 | Libit | 280/42 |
| 4,538,696 | 9/1985 | Carter | 180/19.3 |
| 4,570,732 | 2/1986 | Craven | 180/19.3 |
| 4,684,141 | 8/1987 | Nunokawa | 280/42 |
| 4,762,193 | 8/1988 | Levine | 280/DIG. 5 |
| 4,796,909 | 1/1989 | Kirkendall | 180/906 |
| 4,848,504 | 7/1989 | Olson | 180/19.1 |
| 4,974,693 | 12/1990 | Nakai et al. | 180/19.3 |
| 5,036,938 | 8/1991 | Blount et al. | 180/208 |
| 5,074,576 | 12/1991 | Finlay | 280/DIG. 6 |
| 5,121,808 | 6/1992 | Visentini et al. | 180/906 |
| 5,137,103 | 8/1992 | Cartmell | 280/DIG. 5 |
| 5,167,389 | 12/1992 | Reimers | 180/19.1 |
| 5,180,023 | 1/1993 | Reimers | 180/19.1 |
| 5,232,065 | 8/1993 | Cotton | 180/19.1 |
| 5,350,982 | 9/1994 | Seib | 318/139 |
| 5,685,385 | 11/1997 | Sanuga | 280/DIG. 5 |
| 5,749,424 | 5/1998 | Reimers | 180/19.2 |
| 5,879,124 | 3/1999 | Brouwer et al. | 180/906 |

Primary Examiner—Brian L. Johnson
Assistant Examiner—Matthew Luby
(74) Attorney, Agent, or Firm—Shughart Thomson & Kilroy P.C.

(57) ABSTRACT

A motorized golf bag cart includes a base frame which extends and retracts telescopically to respectively expand or collapse a battery mounting area. A drive motor supported in the base frame is linked to a drive axle which selectively drives a pair of drive wheel hubs positioned on respective opposite sides of the base frame. The base frame also includes a pair of transversely extending hollow tube which receive respective first and second telescoping support axles such that they are movable between an extended, operative position and a retracted, compact storage position. An articulating handle is designed to be compactly folded. The inventive golf bag cart is thus quickly and easily changeable between an extremely compact storage and transport configuration and a very stable, four wheeled, operative position.

4 Claims, 3 Drawing Sheets

MOTORIZED GOLF BAG CART

FIELD OF THE INVENTION

The present invention relates to a motorized golf bag cart, and, more particularly, to such a motorized cart which is stable and efficient when loaded with a golf bag, but which collapses to an extremely compact size when not in use.

BACKGROUND OF THE INVENTION

A number of motorized golf bag carts have been developed to carry a golfer's bag while he or she walks a golf course. These carts have taken a number of different configurations, but have generally fallen into two broad categories, namely motor and battery attachments for existing golf bag hand carts, and self contained, complete, motorized carts. Somewhat representative of the first type is that shown in U.S. Pat. No. 3,941,198 to Chris Kappas, and entitled DETACHABLE POWER UNIT FOR A GOLF BAG CART. In the Kappas patent, an articulated frame includes a battery storage area and a separate motor compartment holding a motor which is positioned immediately above a single drive wheel. The entire frame is removably attachable to a standard two-wheeled golf bag hand cart to convert it to a motorized operation. The drive wheel is chain driven and has no steering capability. Other, similar designs are found in U.S. Pat. No. 4,019,597 to Carmichael, U.S. Pat. No. 4,418,776 to Richard Weirick and U.S. Pat. No. 5,232,065 to James Cotton. Numerous examples of self-contained, motorized golf bag carts also exist. For example, U.S. Pat. No. 4,063,612 to Morris Weiss is a four wheel design with a motor driving the front pair of wheels which are steered by an articulating handle. U.S. Pat. No. 3,952,821 to Charles Craven is a simple two wheel motorized design in which a motor drives a single axle positioned between the two wheels. U.S. Pat. No. 4,106,583 to Edwin Nemeth is a three motorized cart in which a battery compartment is attached to a central, elongate frame and a pair of independent motors are attached to respective front drive wheels. Other examples include U.S. Pat. No. 4,356,875 to Robert Clune, U.S. Pat. No. 4,538,696 to Lee Carter, U.S. Pat. No. 4,974,693 to Masao Nakai et al., U.S. Pat. No. 5,137,103 to James Cartmell, and U.S. Pat. Nos. 5,167,389, 5,180,023 and 5,749,424 to Eric Reimers.

The prior art motorized golf bag carts, as represented by the above patents, seem to suffer from one of two problems. If they are stable, four wheeled designs, they do not collapse enough to be easily stored and transported. Conversely, the three wheeled designs, although they can generally be collapsed to a smaller storage configuration, are much less stable on sloping or uneven terrain.

It is clear, then, that a need exists for a motorized golf bag cart which incorporates a stable, four wheel design with a relatively wide wheel base, and yet is easily collapsible to a size which allows for efficient storage and transport.

SUMMARY OF THE INVENTION

The present invention is directed to a motorized golf bag cart with a stable, four wheel design. The inventive cart includes a base frame with a battery mounting area positioned immediately ahead of a motor compartment which includes a variable speed drive motor. The battery mounting area is formed by a telescoping tube assembly such that the base frame can be extended to accommodate a storage battery, or retracted to eliminate the battery mounting area during storage and transport. The drive motor is linked to a rear, drive axle via a direct gearing transmission to eliminate problems with drive belts or chains. The drive axle drives a pair of drive wheels positioned on respective opposite sides of the base frame. The drive wheels can be made free wheeling in the event of a dead battery, a failed motor or other drive failure. Positioned on the base frame immediately ahead of the battery mounting area are a first and a second transversely extending tube which are hollow and which are sized to receive respective first and second telescoping support axles. Each axle extends outward from its respective tube and mounts one of a pair of front support wheels. Each axle has a pair of locking pin receptacles spaced and sized to receive a respective one of a pair of spring loaded locking pins which extend through an opening in each tube. The axles thus telescope inward and outward relative to the tubes between an extended, operative position and a retracted, storage position. A bag receptacle is attached to and extends forward from the pair of hollow tubes. An articulating handle is attached to the rear of the base frame, with the handle being hinged in two places to allow it to be folded flush against the base frame when stored. A combination speed control rheostat and switch is mounted on the handle near a grip thereof for convenient motor control. In an alternative embodiment, the first and second, tandem hollow tubes are replaced by a single hollow tube which telescopically accommodates both support axles.

OBJECTS AND ADVANTAGES OF THE INVENTION

The principal objects of the present invention include: providing an improved motorized golf bag cart; providing such a cart which is extremely stable in operation, yet is collapsible to a small configuration for storage and transport; providing such a cart in which the support wheels are telescopically received in the base frame such that they can be moved from an operative, wide wheel base position to a narrow storage position; providing such a cart in which a base frame includes a battery mounting area which can be selectively collapsed for storage once the battery is removed; providing such a cart which includes an articulating handle which folds to a compact configuration for storage; and providing such a cart which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
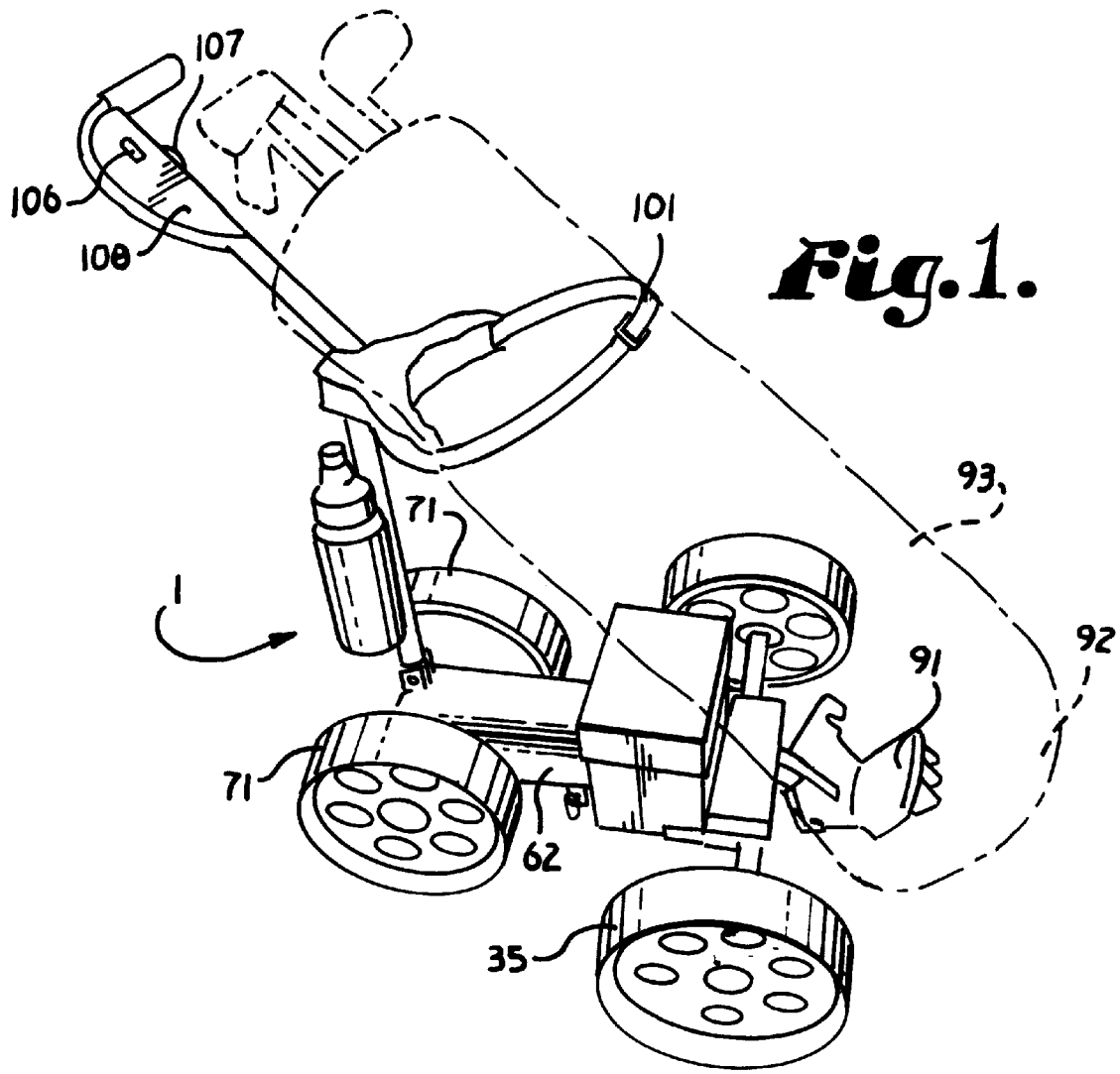
FIG. 1 is a perspective view of a motorized golf bag cart in accordance with the present invention, shown in an open, operative position, with a golf bag shown in phantom lines positioned thereon.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawing FIGS. 1–7, a motorized golf bag cart in accordance with the present invention is illustrated and generally designated as 1. The cart 1 includes a tubular base frame 2. The base frame 2 is formed by a first tube 3 received within a second tube 4 whose inner diameter is slightly larger than the outer diameter of the first tube 3.

Referring to FIGS. 3–5, and 7, a locking pin receptacle 5 is attached to the exterior of the second tube 4 and a locking pin 11 is positioned within the receptacle 5 and engages a coil spring 12 therein. The spring 12 tends to force the pin 11 inward through an pin aperture 13 (FIG. 7) in the second tube 4 and into the interior thereof. The first tube 3 includes a pair of locking pin apertures 14 and 15 positioned to receive the locking pin 11 therein. An upper portion of the locking pin 11 includes a through bore 21 extending transversely there through and a locking pin keeper 22 is positioned within the through bore 21, which keeper 22 prevents the pin 11 from being drawn into the receptacle 5 and also provides a gripping surface to allow a user to retract the pin 11 against the force of the spring 12.

Figure 2:
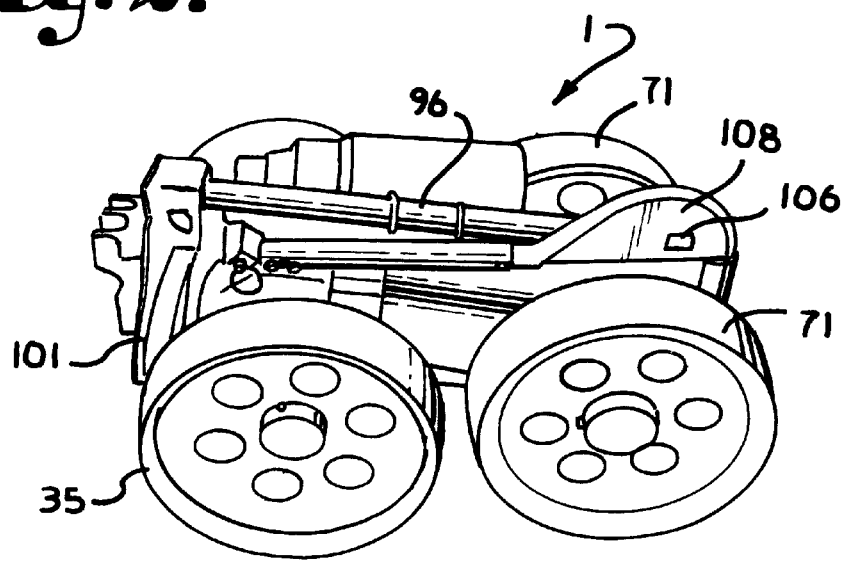
FIG. 2 is a perspective view of the inventive golf bag cart in a collapsed, storage position, taken from the side opposite the view of FIG. 1.
Figure 3:
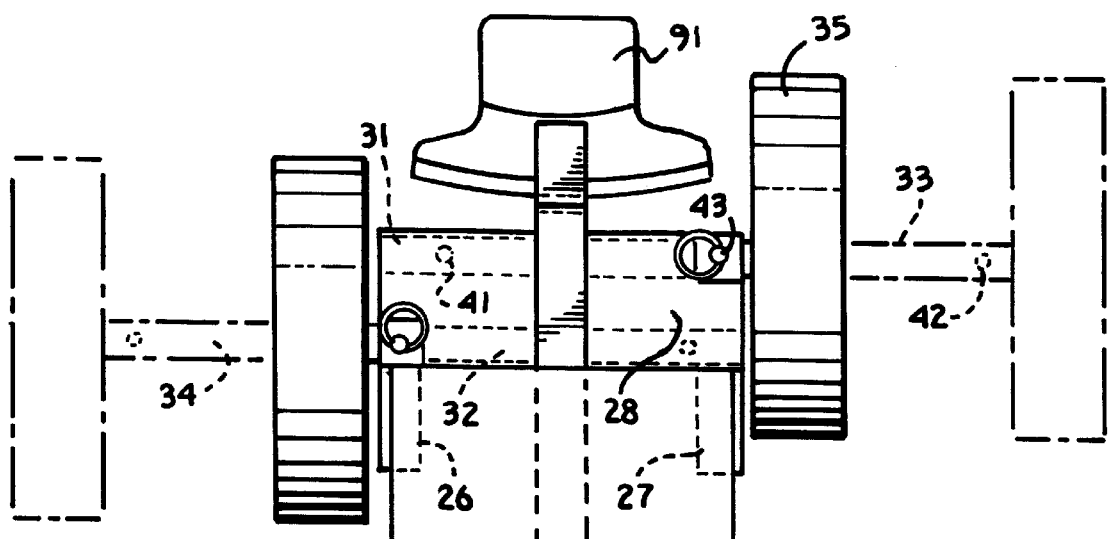
FIG. 3 is an enlarged, fragmentary, top elevational view of a first portion of the cart base frame illustrating a pair of transverse hollow tubes and a corresponding pair of support axles telescopically mounted therein, with the axles telescopically extended shown in phantom lines, and with a motor housing shown in phantom lines to better illustrate the cart base frame.
Figure 4:
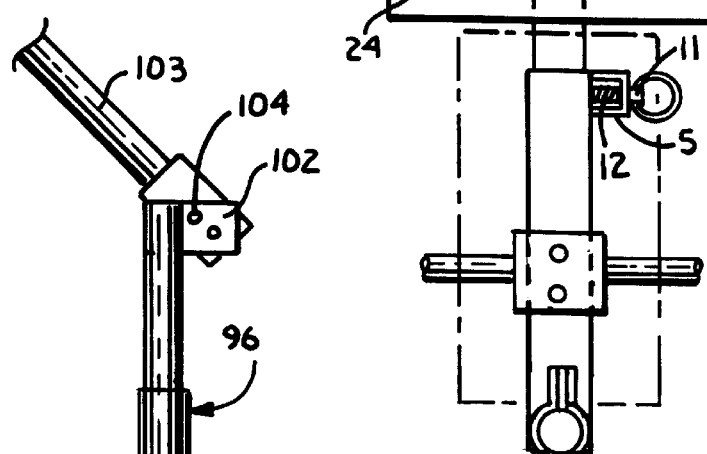
FIG. 4 is a greatly enlarged, fragmentary, side elevational view of a portion of the cart base frame illustrating a battery storage box mounted on the cart base frame with the frame extended to an operative position.
Figure 4:
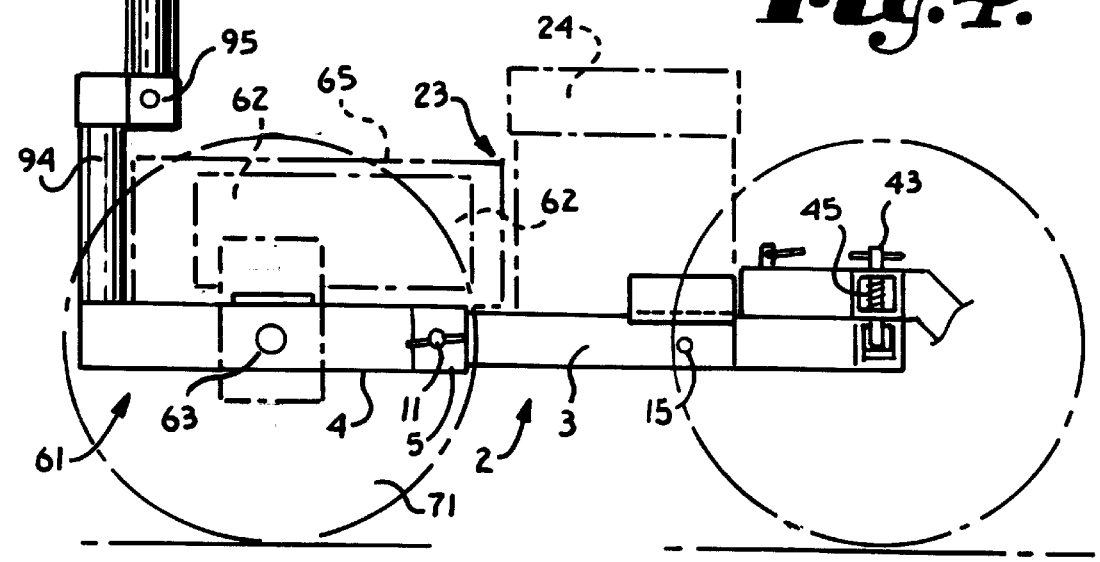
Figure 5:
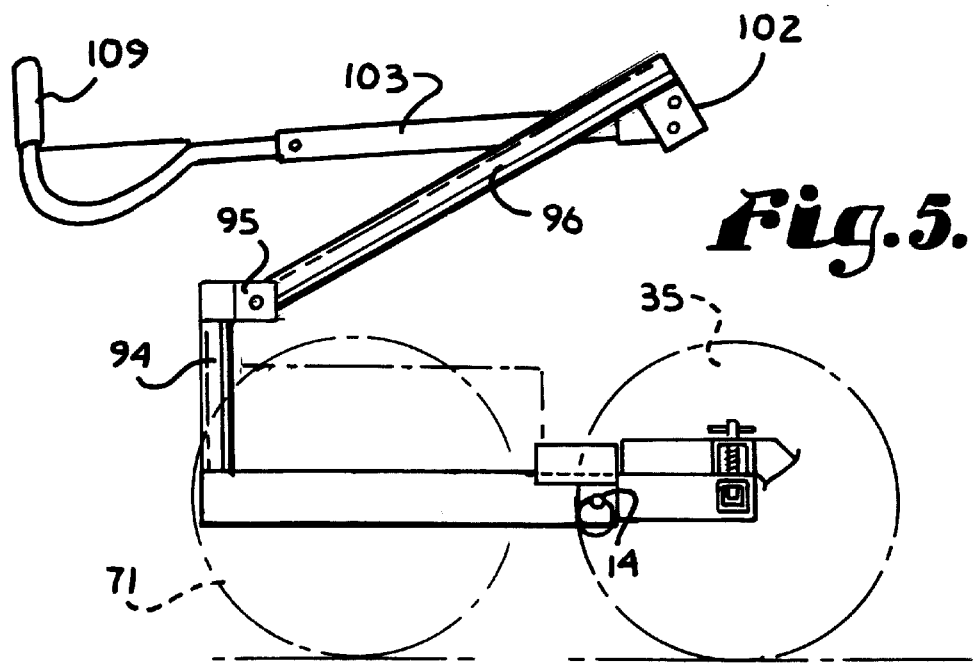
FIG. 5 is a greatly enlarged, fragmentary, side elevational view of the portion of the cart base frame of FIG. 4, but showing the battery storage box removed and showing the base frame collapsed longitudinally to a storage position and showing the articulating handle being folded into a storage configuration.

The first tube 3 can thus be telescopically extended and retracted relative to the second tube 4 between an extended, operative position, as shown in FIGS. 1, 3 and 4, at which the pin aperture 14 receives the pin 11 and a retracted position at which the pin aperture 15 receives the pin 11. This area of the base frame 2 forms a battery mounting area 23 to accommodate a storage battery case 24 and battery (not shown) for providing power to a drive motor 25. A pair of angle members 26 and 27 are attached to and extend forward from a housing 28 to support respective sides of the battery storage case 24. The telescoping tubes 3 and 4 allow the base frame 2 to be collapsed longitudinally once the storage battery and case 24 are removed, as illustrated in FIGS. 2 and 5.

Referring to FIG. 3, the first tube 3 of the base frame 2 is attached to and extends rearward from the housing 28. The housing 28 contains a pair of transversely extending hollow tubes 31 and 32, respectively, which are sized to receive respective first and second telescoping support axles 33 and 34. Each support axle 33 and 34 extends outward from its respective tube 31 and 32 and mounts a respective one of a pair of front support wheels 35. The support axles 33 and 34 and the tubes 31 and 32 are mirror images of each other, and thus only the support axle 33 and the tube 31 will be further described. The support axle 33 includes a pair of locking pin apertures 41 and 42 spaced apart thereon with each aperture 41 and 42 sized to receive a spring loaded locking pin 43 positioned within a locking pin receptacle 44 attached to the exterior of the tube 31 and engaging a coil spring 45 therein. The locking pin receptacle 44, pin 43 and spring 45 are identical in form and function to the locking pin receptacle 5, pin 11 and coil spring 12, and, thus, will not be further described herein.

The support axle 33 can thus be telescopically extended and retracted relative to the tube 31 between an extended support position at which the pin aperture 41 receives the pin 43 and a retracted, storage position at which the pin aperture 42 receives the pin 43. The telescoping support axles 33 and 34 thus allow the support wheels 35 to be collapsed transversely inwardly to an extremely compact configuration, as illustrated in FIG. 2.

Referring to FIG. 4, the base frame 2 includes a motor support area 61 and a variable speed drive motor 62 is attached thereto. The drive motor 62 drives a drive axle 63 via a direct gearing transmission (not shown) in a known manner. The motor 62 and transmission are housed within a motor enclosure 65. A pair of drive wheels 71 are driven by the drive axle 63 to power the cart 1. It is contemplated that a disengagement feature (not shown) can be provided to disengage the drive wheels 71 from the axle 63 in the event of a power failure, such that the drive wheels 71 can become free wheeling.

The cart 1 includes a bag receptacle 91 attached to and extending forward from the housing 38, with the receptacle shaped to receive a base portion 92 of a golf bag 93, shown in phantom lines in FIG. 1.

Referring to FIGS. 1, 4 and 5, an upright post 94 is attached to and extends upward at an approximate 90 degree angle from the second tube 4 of the base frame 2. A pivot support 95 is attached to the post 94 near the upper end and a first handle member 96 is pivotably attached to the upright post 94 thereby. The first handle member or bag rest arm 96 is preferably of a two-part telescoping construction with an inner tube 97 telescoping into an outer tube 98, which allows it to be collapsed downward for storage to render it more compact. The first handle member 96 can be locked into the extended position via a spring pin 99.

A golf bag securing loop 101 is attached to the first handle member 96 such that it is pivotable with the first handle member 96 with respect to the post 94. A second pivot support 102 is attached to the first handle member 96 near the top thereof. An articulating second handle member 103 is attached to the second pivot support 102, with the second handle member 103 being locked into an operative position by a locking pin 104 and unlocked to be folded to the compact storage position shown in FIG. 2 by releasing the locking pin 104.

A motor on-off switch 106 and a motor speed control rheostat 107 are attached to a generally semi-circular handle control plate 108 to allow a user to easily control motor operation and speed.

Figure 6:
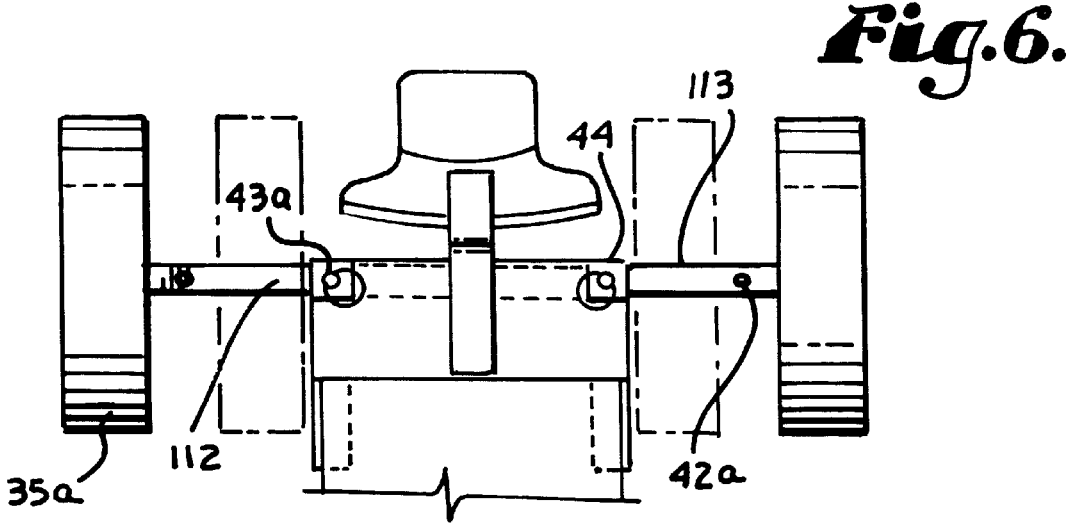
FIG. 6 is a greatly enlarged, fragmentary, top elevational view of a portion of a second embodiment of the motorized golf bag cart, with a pair of support axles telescopically received within a single transverse hollow tube, with the axles telescopically extended shown in phantom lines.
Figure 7:
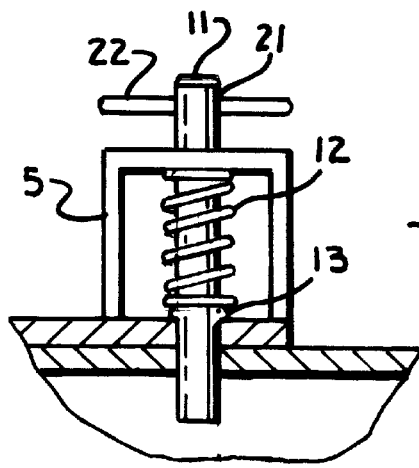
FIG. 7 is a greatly enlarged, fragmentary view of one of a plurality of spring pin receptacles which are positioned on the cart in a manner allowing the cart to be selectively locked in the storage or operative position.

FIG. 6 illustrates an alternative embodiment for telescoping the support wheels 35a of a modified bag cart 1a. In this alternative embodiment 1a, the first and second, tandem hollow tubes 31 and 32 of FIG. 3 are replaced by single hollow tube ill which telescopically accommodates a pair of drive axles 112 and 113 on respective open ends thereof. Just as in the tandem tube arrangement, each support axle 112 and 113 includes a pair of locking pin apertures 41a (not shown) and 42a spaced apart thereon with each aperture 41a and 42a sized to selectively receive a spring loaded locking pin 43a positioned within a locking pin receptacle 44a. Again, the locking pin receptacles 44a and spring loaded pins 43a are identical in form and function to the locking pin receptacle 5, pin 11 and coil spring 12, and, thus, will not be further described herein.

Each support axle 112 and 113 can thus be telescopically extended and retracted relative to the tube 111 between an extended support position at which the pin aperture 41a receives the pin 43a and a retracted, storage position at which the pin aperture 42a receives the pin 43a. The second embodiment of bag cart la in FIG. 6 can include a telescoping battery storage area similar to the battery storage area 23, or this feature can be eliminated for cost saving purposes.

The invention has been illustrated and described in a particular design, but other mechanisms for telescoping the support wheels 35 and battery mounting area 23 can be visualized which might be equally effective. For example, the base frame 2 can be made of two or more telescoping support tubes instead of the single tubes 3 and 4. The size and shape of the various frame and support axle tubes is illustrative only, and other shapes and sizes could perform as well. Other variation will occur to those skilled in the art. It is thus to be understood that while certain forms of the present invention have been illustrated and described herein, it is not to be limited to the specific forms or arrangement of parts described and shown.

We claim:

1. A motorized golf bag cart utilizing a battery, removably securable, thereto for providing electrical energy to said cart, comprising:
   a. a first base frame member with a longitudinal axis extending substantially in a direction of travel of said cart;
   b. a second base frame member with a longitudinal axis extending substantially in a direction of travel of said cart; said second base frame member being telescopically mounted relative to said first base frame member such that said second base frame member is selectively extendable and retractable relative to said first base frame member between respective base frame operative and storage positions; a battery mounting area, sized for receiving the storage battery and being formed across said first and second base frame members when extended to said base frame operative position; wherein retraction of said first and second base frame members to said base frame storage position substantially reduces the size of said battery mounting area to a size insufficient to receive the battery;
   c. at least three wheels rotatably connected relative to said first or second base frame members;
   d. a motor mounted to said cart and drivingly engaging at least one of said wheels; said motor being electrically connectable to the battery supported on said battery receiving area.

2. A motorized golf bag cart utilizing a battery for providing electrical energy thereto, comprising:
   a) a base frame comprising:
      i) a first frame member with a longitudinal axis extending substantially in a direction of travel of said cart; and
      ii) a second frame member telescopically secured to said first frame member such that said second frame member can be selectively extended and retracted relative to said first frame member between respective base frame operative and storage positions;
   b) a pair of support wheels rotatably connected to said second frame member;
   c) a drive wheel rotatably connected to said first frame member;
   d) a golf bag receptacle secured to said second frame member for supporting a bottom portion of a golf bag;
   e) a battery support member connected to said second frame member and adapted to support a battery on top of said second frame member;
   f) a motor connected to said first frame member and drivingly engaging said drive wheel; said motor electrically connectable to a battery removably secured to said base frame when said second frame member is extended to said base frame operative position such that said battery is supported by said battery support member in a battery mounting space extending from an inner end of said motor and toward said golf bag receptacle; and wherein
   g) when said second frame member is retracted to said storage position said motor extends into said battery mounting space.

3. The motorized golf bag cart as in claim 2 wherein said said battery support member comprises a pair of battery support members extending on opposite sides of said second frame member.

4. A motorized golf bag cart utilizing a battery for providing electrical energy thereto, comprising:
   a) a base frame comprising:
      i) a first frame member with a longitudinal axis extending substantially in a direction of travel of said cart; and
      ii) a second frame member with a longitudinal axis extending substantially in the direction of travel of said cart, said second frame member being telescopically mounted relative to said first frame member such that said second frame member can be selectively extended and retracted relative to said first frame member between respective base frame operative and storage positions;
      iii) first axle support member secured to and extending transverse to said second frame member and a second axle support member secured to and extending transverse to said second frame member in generally parallel relation to said first axle support member;
      iv) a first support wheel rotatably mounted on a first axle and a second support wheel rotatably mounted on a second axle; said first axle support member telescopically receiving only said first axle and said second axle support member telescopically receiving only said second axle such that said first and second support axles, and said first and second wheels mounted thereon, are selectively extendable and retractable between respective operative and storage positions;
      v) a pair of battery support members secured to and extending forward from said first axle support member in parallel and spaced relationship on opposite sides of said second frame member;

c) a drive wheel rotatably connected to said first frame member;

b) a motor connected to said first frame member and drivingly engaging said drive wheel; said motor being electrically connectable to a battery which is removably securable to said base frame when said second frame member is extended to said base frame operative position such that said battery is supported by said battery support members in a battery mounting area extending between an inner end of said motor and said first axle support member; and wherein c) when said second frame member is retracted to said storage position said motor extends into said battery mounting area.

* * * * *

UNITED STATES PATENT AND TRADEMARK OFFICE
CERTIFICATE OF CORRECTION

PATENT NO. : 6,283,238 B1  
DATED : September 4, 2001  
INVENTOR(S) : Royer et al.

It is certified that error appears in the above-identified patent and that said Letters Patent is hereby corrected as shown below:

Title page,
Item [54] Inventors, "Clyde J. Fleener" and all associated reference thereafter should be deleted.

Signed and Sealed this

Fourteenth Day of May, 2002

*Attest:*

*Attesting Officer*

JAMES E. ROGAN  
*Director of the United States Patent and Trademark Office*